United States Patent [19]
Itaya et al.

[15] 3,669,989
[45] June 13, 1972

[54] CYCLOPROPANECARBOXYLIC ACID ESTERS

[72] Inventors: Nobushige Itaya, Minoo-shi; Katsuzo Kamoshita, Toyonaka-shi; Toshio Mizutani, Hirakata-shi; Shigeyoshi Kitamura, Toyonaka-shi; Shinji Nakai; Nobuyuki Kameda, both of Takarazuka-shi; Keimei Fujimoto, Kyoto; Yositosi Okuno, Toyonaka-shi, all of Japan

[73] Assignee: Sumitomo Chemical Company, Ltd., Osaka, Japan

[22] Filed: May 26, 1969

[21] Appl. No.: 827,903

[30] Foreign Application Priority Data

June 13, 1968 Japan...................................43/41107
June 13, 1968 Japan...................................43/41108

[52] U.S. Cl..............260/332.2 R, 260/332.2 A, 260/340.5, 260/347.2, 424/275, 424/282, 424/285
[51] Int. Cl....................................C07d 63/12, C07d 5/16
[58] Field of Search..................260/332.2 R, 468 P, 347.4 R, 260/340.5

[56] References Cited

UNITED STATES PATENTS

| | | | |
|---|---|---|---|
| 2,857,309 | 10/1958 | Barthel | 167/30 |
| 3,358,011 | 12/1967 | Elliott | 260/468 |
| 3,414,607 | 12/1968 | Fujimoto | 260/468 |
| 3,465,007 | 9/1969 | Elliott | 260/347.4 |
| 3,509,180 | 4/1970 | Elliott | 260/347.4 |
| 3,515,730 | 6/1970 | Matsui | 260/332.2 |
| 3,519,649 | 7/1970 | Ueda | 260/332.2 |

FOREIGN PATENTS OR APPLICATIONS 1,133,554  11/1968  Great Britain.....................260/347.4

OTHER PUBLICATIONS

Gersdorff, et al., J. Econ. Entom. 52:521–4 (6–59).
Friedman, Symposium on Chem.–Biol. Correlation, Nat' l. Acad. Sci.–Nat' l. Research Council, publ. No. 206, Wash., D.C., 1951, pp. 296–305.
Burger, Med. Chem. (Interscience, N.Y., 1960) pp. 75–7.

Primary Examiner—Henry R. Jiles
Assistant Examiner—Cecilia M. Shurko
Attorney—Stevens, Davis, Miller & Mosher

[57] ABSTRACT

Novel phenyloxy-furylmethyl or -thenyl 2,2-dimethyl 3-substituted cyclopropane carboxylate of the formula:

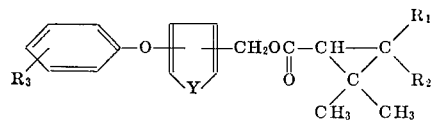

wherein $R_1$ is a hydrogen atom or methyl group; $R_2$ is methyl, 2-methyl-1-propenyl, 2-methoxycarbonyl-1-propenyl, phenyl or 3,4-methylenedioxyphenyl group when $R_1$ is a hydrogen atom, or methyl group when $R_1$ is methyl group; $R_3$ is a hydrogen or a halogen atom or methyl group; and Y is an oxygen or a sulfur atom; which carboxylate is useful as an insecticide and is prepared by the esterification of the reactive derivatives of the carboxylic acid with the furylmethyl or thenyl compounds.

7 Claims, No Drawings

CYCLOPROPANECARBOXYLIC ACID ESTERS

The present invention relates to a novel carboxylic acid ester, and more particularly to a new furylmethyl or thenyl cyclopropanecarboxylate having insecticidal activities and a method for the production thereof. The present invention further relates to an insecticidal composition containing said novel ester.

PRIOR ART

Among the insecticides used at present time, nothing can compare with pyrethrum extracts including pyrethrin or synthetic allethrin which is a homologue thereof, in the fact that it can be used without anxiety due to its harmlessness to mammals and cattle in spite of its immediate effect. However, the pyrethrin extract and homologue thereof are relatively expensive, and are rather limited in this use despite their excellent properties.

After studying to obtain new effective esters the inventors have found a new type ester which is remarkably excellent in insecticidal activity as compared with the above pyrethrin and its homologue and is prepared at low costs. Thus, the present invention is achieved.

OBJECT

An object of the present invention is to provide a new cheap carboxylic acid ester having more excellent insecticidal activity.

CHEMICAL COMPOUNDS

According to the present invention, a novel cyclopropanecarboxylic acid ester is provided, said ester having the following formula,

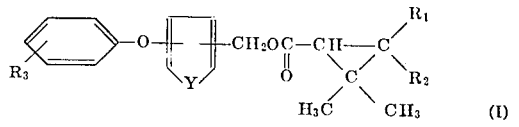

(I)

wherein $R_1$ is a hydrogen atom or methyl group; $R_2$ is methyl, 2-methyl-1-propenyl, 2-methoxycarbonyl-1-propenyl, phenyl or 3,4-methylenedioxyphenyl group when $R_1$ is a hydrogen atom and is methyl group when $R_1$ is methyl group; $R_3$ is a hydrogen or a halogen atom or methyl group; and Y is an oxygen or a sulfur atom.

It will be appreciated that the novel ester of formula (I) includes naturally optically active isomers which occur due to the asymmetric carbon atom possible present in the carboxylic acid moiety such as d-trans-crysanthemummonocarboxylic residue.

Among the esters represented by the formula (I), the especially useful ones that are not limitative in the present invention, are enumerated as follows:

COMPOUND NUMBER:

STRUCTURE (1)
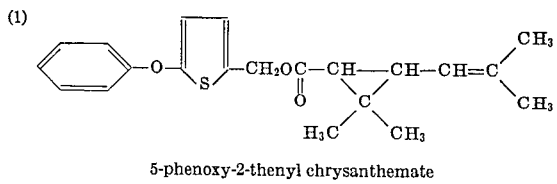

5-phenoxy-2-thenyl chrysanthemate (2)
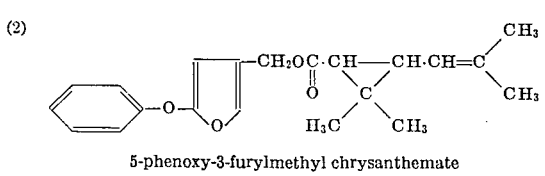

5-phenoxy-3-furylmethyl chrysanthemate

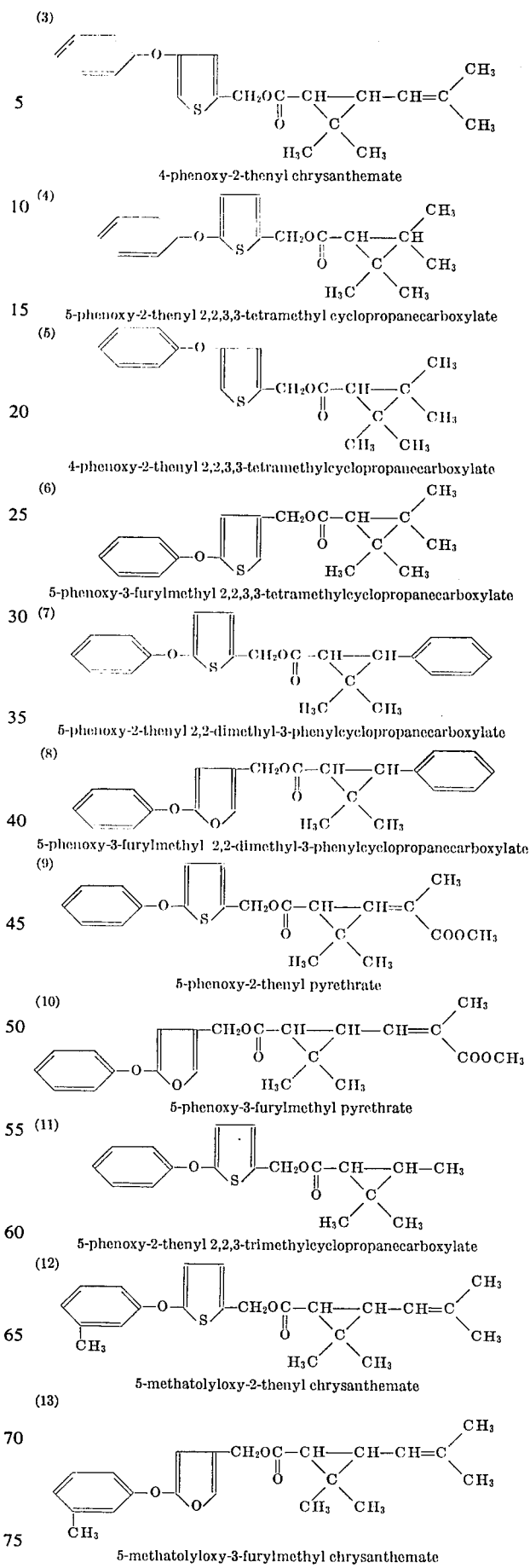

(3) 4-phenoxy-2-thenyl chrysanthemate (4) 5-phenoxy-2-thenyl 2,2,3,3-tetramethyl cyclopropanecarboxylate (5) 4-phenoxy-2-thenyl 2,2,3,3-tetramethylcyclopropanecarboxylate (6) 5-phenoxy-3-furylmethyl 2,2,3,3-tetramethylcyclopropanecarboxylate (7) 5-phenoxy-2-thenyl 2,2-dimethyl-3-phenylcyclopropanecarboxylate (8) 5-phenoxy-3-furylmethyl 2,2-dimethyl-3-phenylcyclopropanecarboxylate (9) 5-phenoxy-2-thenyl pyrethrate

(10) 5-phenoxy-3-furylmethyl pyrethrate

(11) 5-phenoxy-2-thenyl 2,2,3-trimethylcyclopropanecarboxylate

(12) 5-methatolyloxy-2-thenyl chrysanthemate

(13) 5-methatolyloxy-3-furylmethyl chrysanthemate

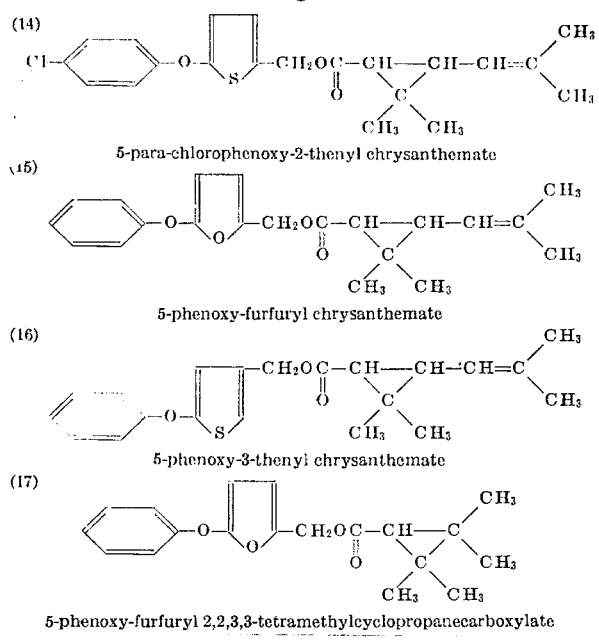

(14) 5-para-chlorophenoxy-2-thenyl chrysanthemate

(15) 5-phenoxy-furfuryl chrysanthemate

(16) 5-phenoxy-3-thenyl chrysanthemate

(17) 5-phenoxy-furfuryl 2,2,3,3-tetramethylcyclopropanecarboxylate

USE OF THE COMPOUND

The cyclopropanecarboxylate of formula (I) has excellent activity for killing insects such as house flies, mosquitoes, cockroaches and the like, and can be used as insecticidal compositions not only in a wide scope for the prevention of epidemics but also controlling insects injurious to stored cereals, agriculture, especially crops before harvest, household horticulture, green-house cultivation and food-packaging, without anxiety due to its low toxicity.

PROCESS FOR PRODUCTION OF COMPOUND

The carboxylic acid ester of formula (I) is prepared for the first time by the present inventors, and is obtained easily and in good yield, for example, by the method comprising reacting a phenyloxy-furylmethyl or -thenyl derivative of the formula,

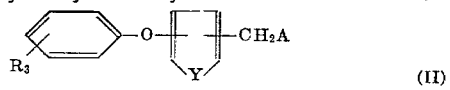

(II)

wherein $R_3$ and Y are same as defined above, and A is a halogen atom or hydroxyl or tosyloxy group, with a cyclopropanecarboxylic acid of the formula,

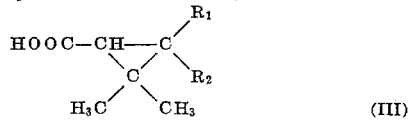

(III)

wherein $R_1$ and $R_2$ are the same as defined above, or its reactive derivatives, in the presence of a suitable reaction-auxiliary agent, if necessary.

The furylmethyl or thienyl derivative of formula (II) used in the method of the present invention is selected in such relation to the other reactant, cyclopropanecarboxylic acid and its reactive derivatives of formula (III) as to enable it to be subjected to esterification. The reactive derivatives of the carboxylic acid of formula (III) means the corresponding acid halide, acid anhydride, lower alkyl ester or salt. The following disclosure will explain more particularly the method of the preparation of the cyclopropanecarboxylic acid ester of formula (I) according to the present invention.

The first embodiment of the method is to obtain the objective ester by reacting as the phenyloxy-furylmethyl or -thenyl derivative an alcohol of the formula,

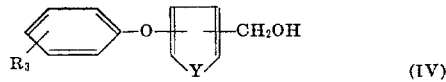

(IV)

wherein $R_3$ and Y are same as defined above, with the cyclopropanecarboxylic acid of formula (III), acid halide, acid anhydride or lower alkyl ester thereof. When the acid itself is used, the reaction is completed under the condition of dehydration. Thus, the reaction is carried out by heating in the presence of a dehydration catalyst such as mineral acids and para-toluene sulfonic acid or azeotropic solvent such as benzene and toluene. Alternatively, the reaction may be carried out in an inert solvent such as benzene, petroleum ether, containing a dehydrating agent such as dicyclohexylcarbodiimide with or without heating.

When the acid halide is used, the reaction is effected well at room temperature in the presence of an organic tertiary amine such as pyridine, triethylamine and the like as a de-hydrogen halide agent. Any acid halide may be used but acid chloride is usually used. In the reaction, the use of solvents is preferable to allow the reaction to proceed smoothly, and an inert solvent such as benzene, toluene and petroleum benzene is preferably used.

When the acid anhydride is used as the reactant, the reaction can proceed without any reaction-auxiliary agent, well at the room temperature to form the objective ester of formula (I). Warming of the reaction system and the use of solvents are favorable for allowing the reaction to proceed smoothly, but they are not always indispensable.

When the lower alkyl ester is used as the reactant, the reaction is completed in the presence of a basic catalyst such as sodium alkoxide under heating condition, and proceeds smoothly by the use of an inert solvent such as benzene, toluene and the like. The preferable lower alkyl ester used in the present method includes methyl ester, ethyl ester, n-propyl ester, iso-propyl ester and n-butyl ester, of the cyclopropanecarboxylic acid of formula (III).

The second embodiment of the process according to the present invention is to prepare the objective ester of formula (I) from furylmethyl halides or thenyl halides of the formula,

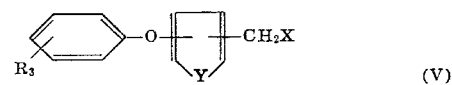

(V)

wherein X is a halogen atom, and $R_3$ and Y are same as defined above. The another reactant is the salts of the carboxylic acid of formula (III) with alkali metals or tertiary amines, which salts may be formed in situ in the reaction by adding the corresponding bases forming such salts to the reaction mixture. The reaction is preferably carried out in the presence of an inert solvent such as benzene, acetone and the like at a temperature of the boiling point or lower of the solvents for allowing the reaction to proceed. Among the halogen atoms represented by X in formula (V), chlorine or bromine atom is, in general, common, but other halogen atoms may be selected optionally.

The third embodiment of the method according to the present invention is to obtain the objective ester of formula (I) from furylmethyl tosylates or thenyl-tosylates of the formula,

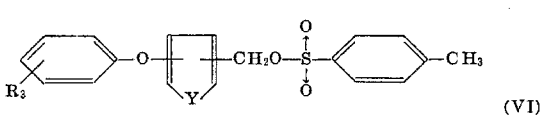

(VI)

wherein $R_3$ and Y are same as defined above. In this case, the another reactant is the same as used in the second embodiment, and the reaction conditions are also the same as used therein.

STARTING MATERIALS

The cyclopropanecarboxylic acid of formula (III) used as the reactant according to the present invention can be prepared by already known processes, and, if necessary, may be converted to each of the reactive derivatives according to well known methods. The furylmethyl alcohols and thenylalcohol represented by formula (IV) are easily prepared by reducing the corresponding carboxylic acid ester or aldehyde, and the furylmethyl halides and thenyl halides may be prepared by halogenating the corresponding alcohols of formula (IV), respectively. The tosylates of formula (VI) may be also easily prepared by reacting the alcohols of formula (IV) with p-toluene sulfonyl chloride.

It will be appreciated that the carboxylic acid of formula (III) and its derivatives may include optically active isomers such as d-trans-chrysanthemic acid and reactive derivatives thereof.

INSECTICIDAL COMPOSITION

In the preparation of insecticidal compositions, the new esters of formula (I) may be formulated into any desired forms of oil sprays, emulsifiable concentrates, dusts, wettable powders, aerosols, mosquito coils, fumigants, granules, baits and luring dust or solid preparation, according to known method in the art, using auxiliary agents and/or carriers for common insecticidal compositions.

The insecticidal compositions thus formed may be increased in its activity when used in admixture with a synergist for pyrethroid such as 3,4-methylenedioxy-6-propylbenzylbutyldiethylene glycol ether (hereinafter referred to as "-piperonylbutoxide"), 1,2-methylenedioxy-4 [2-(octylsulfinyl)-propyl]-benzene (hereinafter referred to as "sulfoxide"), N-(2-ethylhexyl)-bicyclo[2,2,1]hepta-5-ene-2,3-dicarboximide (hereinafter referred to as "MGK-264", registered trade name for said imide produced by McRolin Gormley King Co.), N-(4-pentynyl)-phthalimide or n-propyl-0-propargylphenyl phosphonate (hereinafter referred to NIA-16388). When the present compounds are formulated into mosquito coils, the activity can be increased by incorporation of a known additive therefor, such as terephthalic or isophthalic acid and butylhydroxytoluene (referred to as "BHT"). In addition, the present compounds may be formulated into multipurpose compositions by incorporating other active ingredients such as pyrethroids, for example, pyrethrum extracts, allethrin, 3,4,5,6-tetrahydrophthalimidomethyl chrysanthemate (hereinafter referred to as "tetramethrin"), 5-benzyl-3-furylmethyl chrysanthemate; organic chloride insecticides, for example, dichlorodiphenyl-trichloromethane (referred to as "DDT"), benzene hexachloride (referred to as "BHC") and methoxychlor; organophosphorus insecticides, for example, 0,0-dimethyl-0-(3-methyl-4-nitrophenyl) phosphorothioate (hereinafter referred to as "fenitrothion"), 0,0-dimethyl-0-(2,2-dichlorovinyl) phosphate (referred to as "DDVP"); carbamate type insecticides, for example, 1-napthyl-N-methylcarbamate and 3,4-xylyl-N-methylcarbamate; or other insecticides, fungicides, acaricides, herbicides, fertilizers or other agricultural chemicals.

The present invention will be more particularly illustrated by the following examples which should not restrict the invention defined in the attached claims.

EXAMPLES 1–17

Production of the Cyclopropanecarboxylic Acid Esters

The esters of the present invention shown in Table 1 were produced by standard processes each represented by A, B, C, D, E and F as follows.

Process A: The Reaction of the Alcohol of the Formula (IV) and the Carboxylic Acid Halide.

In a solution of 0.05 mol. of the alcohol in 3 times by volume of dry benzene 0.075 mol. of pyridine are dissolved. To the solution, there is added a solution containing 0.053 mol. of the carboxylic acid chloride in 3 times by volume of dry benzene for a time to react under generation of heat. After allowed to stand over night while tightly sealed, the reaction mixture is added with a slight amount of water to dissolve pyridine hydrochloride precipitate, and the aqueous layer formed is removed. The organic layer is successively washed with an aqueous solution containing 5 percent by weight of hydrochloric acid and a saturated aqueous solution of sodium hydrogencarbonate, and saturated sodium chloride and dried over anhydrous sodium sulfate, and distilled to remove benzene. The residual liquid is subjected to silica gel chromatography to recover the purified objective ester in the form of a pale yellow oil.

Process B: The Dehydration Reaction Between the Alcohol of Formula (IV) and the Carboxylic Acid of Formula (III).

To a solution of 0.05 mol. each of the alcohol and the carboxylic acid in 3 times by volume of benzene, 0.08 mol. of dicyclohexylcarbodiimide is added while stirring, and the reaction mixture is allowed to stand over night, while tightly sealed. Next day, the reaction is completed by refluxing for 2 hours, and then the objective ester is recovered by the same procedures as described in Process A.

Process C: The Reaction of the Alcohol of Formula (IV) and the Carboxylic Acid Anhydride.

To a solution of 0.05 mol. of the alcohol in 3 times by volume of toluene, 0.055 mol. of the carboxylic acid anhydride prepared by reaction of the carboxylic acid of formula (III) and acetic anhydride, is added, and heated at 100° C. for 3 hours to complete the reaction. After it is cooled, the reaction mixture is neutralized with 10 percent aqueous solution of sodium hydroxide at a temperature of not higher than 10° C., and the carboxylic acid resulting from the reaction is recovered as the sodium salt thereof from the aqueous layer. The organic layer is treated by the same procedure as described in Process A, and the objective ester is thus obtained.

Process D: The Ester Exchange Reaction Between the Alcohol of Formula (IV) and the Lower Alkyl Ester of the Carboxylic Acid.

To a solution of 0.06 mol. of ethyl ester of the carboxylic acid of formula (III) and 0.05 mol. of the alcohol in 5 times by volume of dried toluene, 0.005 mol. of sodium exthoxide is added. The reaction system is well stirred and refluxed for 10 hours to complete the reaction, while removing the formed ethanol as azeotropic mixture from the top of the rectification column. After adding water carefully, then the objective ester is recovered from the organic layer by the same procedure as described in Process A.

Process E: The Reaction of the Halide of Formula (V) and the Carboxylic Acid of Formula (III).

A solution of 0.05 mol. of the halide and 0.06 mol. of the carboxylic acid in 3 times by volume of acetone is warmed at 15° to 20° C., and is added dropwise with a solution of 0.08 mol. of triethylamine in 3 times by volume of acetone over a time of 1 hour while stirring. After the addition, the reaction system is refluxed for 2 hours to complete the reaction and cooled. The precipitating triethylamine hydrochloride is filtered off. The filtrate is distilled to remove acetone. Three times by volume of benzene is added to the remaining liquid. The organic layer is treated by the same procedures as described in Process A, and the objective ester is recovered.

Process F: The Reaction of the Tosylate of Formula (VI) and Salt of the Carboxylic Acid of Formula (III).

To a solution of 0.05 mol. of the tosylate in 3 times by volume of acetone, 0.06 mol. of the sodium carboxylate which has been prepared by reacting the carboxylic acid and sodium hydroxide in water and distilling off water to obtain a dry mass, is added at a room temperature over a time of 30 minutes while stirring. The reaction mixture is refluxed for 30 minutes to complete the reaction, and cooled. A precipitate formed is filtered off, and the filtrate is distilled to remove the acetone. The remaining is dissolved in 3 times by volume of benzene, and the objective ester is recovered from the organic liquid by the procedures as described in Process A.

According to the above-mentioned standard processes, resulting esters are each shown in the following Table 1 from the starting materials which are also shown therein.

TABLE 1

| Example No. | Starting materials | | | Yielding cyclopropanecarboxylic acid ester | | | | | | |
|---|---|---|---|---|---|---|---|---|---|---|
| | Furylmethyl or thienyl derivative | Cyclopropanecarboxylic acid or its derivative | Process | Compound | Theoretical yield (percent) | Refractive index ($n_D^{25}$) | | Elementary analysis (percent) | | |
| | | | | | | | | C | H | S | Cl |
| 1 | 5-phenoxy-2-thenyl alcohol | dl-Cis, trans-crysanthemum-monocarboxylic acid chloride | A | 5-phenoxy-2-thenyl crysanthemate | 92 | 1.5488 | Found / Calculated | 70.6 / 70.8 | 7.0 / 6.8 | 8.8 / 9.0 | } As $C_{21}H_{24}O_3S$ |
| 2 | 5-phenoxy-3-furylmethyl alcohol | dl-Cis, trans-crysanthemum-monocarboxylic acid chloride | A | 5-phenoxy-3-furylmethyl chrysanthemate | 90 | 1.5226 | Found / Calculated | 74.1 / 74.1 | 7.2 / 7.1 | | } As $C_{21}H_{24}O_4$ |
| 3 | 4-phenoxy-2-thenyllosylate | Sodium dl-cis, transchrysanthemum-monocarboxylate | F | 4-phenoxy-2-thenyl chrysanthemate | 86 | 1.5454 | Found / Calculated | 70.3 / 70.8 | 7.2 / 6.8 | 9.1 / 9.0 | } As $C_{21}H_{24}O_3S$ |
| 4 | 5-phenoxy-2-thenyl alcohol | 2,2,3-tetramethyl-1-cyclopropanecarboxylic acid chloride | A | 5-phenoxy-2-thenyl 2,2,3,3-tetramethyl cyclopropanecarboxylate | 90 | 1.5418 | Found / Calculated | 68.8 / 69.1 | 7.1 / 6.7 | 10.1 / 9.7 | } As $C_{19}H_{22}O_3S$ |
| 5 | 4-phenoxy-2-thenyl alcohol | Ethyl 2,2,3,3-tetramethylcyclopropanecarboxylate | D | 4-phenoxy-2-thenyl 2,2,3,3-tetramethylcyclopropanecarboxylate | 83 | 1.5370 | Found / Calculated | 68.4 / 69.1 | 7.0 / 6.7 | 9.8 / 9.7 | } As $C_{19}H_{22}O_3S$ |
| 6 | 5-phenoxy-3-furylmethyl alcohol | 2,2,3,3-tetramethyl cyclopropanecarboxylic acid anhydride | C | 5-phenoxy-3-furylmethyl 2,2,3,3-tetramethylcyclopropanecarboxylate | 87 | 1.5164 | Found / Calculated | 72.4 / 72.6 | 7.1 / 7.1 | | } As $C_{19}H_{24}O_4$ |
| 7 | 5-phenoxy-2-thenyl alcohol | dl-Cis, trans-2,2-dimethyl-1,3-phenyl-cyclopropanecarboxylic acid chloride | A | 5-phenoxy-2-thenyl 2,2-dimethyl-3-phenyl-cyclopropane carboxylate | 93 | 1.5780 | Found / Calculated | 72.3 / 73.0 | 6.0 / 5.9 | 9.0 / 8.5 | } As $C_{23}H_{22}O_3S$ |
| 8 | 5-phenoxy-3-furylmethyl alcohol | dl-Cis, trans-2,2-dimethyl-1,3-phenylcyclopropanecarboxylic acid chloride | A | 5-phenoxy-3-furylmethyl 2,2-dimethyl-3-phenylcyclopropane carboxylate | 90 | 1.5515 | Found / Calculated | 76.5 / 76.2 | 5.8 / 6.1 | | } As $C_{23}H_{22}O_4$ |
| 9 | 5-phenoxy-2-thenyl alcohol | dl-Trans, transpyrethric acid chloride | A | 5-phenoxy-2-thenyl pyrethrate | 89 | 1.5595 | Found / Calculated | 65.9 / 66.0 | 6.2 / 6.0 | 7.3 / 8.0 | } As $C_{22}H_{24}O_5S$ |
| 10 | 5-phenoxy-3-furylmethyl alcohol | dl-Trans, transpyrethric acid | B | 5-phenoxy-3-furylmethyl pyrethrate | 84 | 1.5334 | Found / Calculated | 68.2 / 68.7 | 6.0 / 6.5 | | } As $C_{22}H_{24}O_6$ |
| 11 | 5-phenoxy-2-thenyl alcohol | dl-Cis, trans-2,2,3-trimethyl-1-cyclopropanecarboxylic acid chloride | A | 5-phenoxy-2-thenyl 2,2,3-trimethylcyclopropane carboxylate | 91 | 1.5425 | Found / Calculated | 67.9 / 68.3 | 6.4 / 6.4 | 10.2 / 10.1 | } As $C_{18}H_{20}O_3S$ |
| 12 | 5-m-tolyloxy-2-thenyl chloride | dl-Cis, trans-crysanthemum-monocarboxylic acid | E | 5-m-tolyloxy-2-thenyl chrysanthemate | 87 | 1.5474 | Found / Calculated | 71.0 / 71.3 | 7.4 / 7.1 | 8.9 / 8.7 | } As $C_{22}H_{26}O_3S$ |
| 13 | 5-m-tolyloxy-3-furylmethyl alcohol | dl-Cis, trans-crysanthemum-monocarboxylic acid chloride | A | 5-m-tolyloxy-3-furylmethyl chrysanthemate | 94 | 1.5200 | Found / Calculated | 74.5 / 74.5 | 7.4 / 7.7 | | } As $C_{22}H_{26}O_4$ |
| 14 | 5-p-chlorophenoxy-2-thenyl alcohol | do | A | 5-p-chlorophenoxy-2-thenyl chrysanthemate | 89 | 1.5568 | Found / Calculated | 64.3 / 64.5 | 5.7 / 5.9 | 8.4 / 8.2 | 9.7 / 9.1 } As $C_{21}H_{23}O_3SCl$ |
| 15 | 5-phenoxyfuryl alcohol | do | A | 5-phenoxyfurfuryl chrysanthemate | 89 | 1.5173 | Found / Calculated | 74.0 / 74.1 | 7.5 / 7.3 | | } As $C_{21}H_{24}O_4$ |
| 16 | 5-phenoxy-3-thenyl alcohol | do | A | 5-phenoxy-3-thenyl chrysanthemate | 92 | 1.5165 | Found / Calculated | 70.4 / 70.8 | 7.3 / 6.8 | 9.2 / 9.0 | } As $C_{21}H_{24}O_3S$ |
| 17 | 5-phenoxyfurfuryl alcohol | 2,2,3,3-tetramethylcyclopropanecarboxylic acid chloride | A | 5-phenoxyfurfuryl 2,2,3,3-tetramethylcyclopropanecarboxylate | 91 | 1.5112 | Found / Calculated | 72.4 / 72.6 | 7.3 / 7.1 | | } As $C_{19}H_{22}O_4$ |

PREPARATION OF INSECTICIDAL COMPOSITION AND TEST DATA THEREOF

The esters used are represented by the compound number previously mentioned, and parts are by weight.

EXAMPLE 18

0.05 part of the present compounds (1), (2) and (15), respectively, were dissolved in kerosene to make 100 parts. Three oil sprays were thus obtained.

EXAMPLE 19

0.1 part of the present compound (3) and 0.1 part of DDVP were dissolved in kerosene to make 100 parts. An oil spray was obtained.

EXAMPLE 20

0.1 part of each of the present compounds (4), (6), (9), (10), (12), (13) and (17) were dissolved in kerosene to make 100 parts. Seven oil sprays were thus obtained, respectively.

EXAMPLE 21

0.1 part of the present compound (7) and 0.4 part of piperonyl-butoxide were dissolved in kerosene to make 100 parts, whereby an oil spray was obtained.

EXAMPLE 22

0.1 part of the present compound (11) and 0.4 part of sulfoxide were dissolved in kerosene to make 100 parts, whereby an oil spray was obtained.

EXAMPLE 23

0.1 part of the present compound (14) and 0.4 part of MGK-264 were dissolved in kerosene to make 100 parts, whereby an oil spray was obtained.

EXAMPLE 24

20 parts of each of the present compounds (1), (14), (15) and (16), respectively, 10 parts of Sorpol SM-200 (registered trade name for an emulsifier sold by Toho Kagaku Co.) and 70 parts of xylene were admixed with stirring to make solution, whereby four emulsifiable concentrates containing 20 percent of the active ingredient was obtained, respectively.

EXAMPLE 25

94 parts of 300 mesh diatomaceous earth were added to a solution of 1 part of the present compounds (1) and (2), respectively, and 5 parts of NIA-16388 in 20 parts of acetone. The mixtures were thoroughly mixed by means of a mortar, and acetone was evaporated. Two dust preparations were thus obtained, respectively.

EXAMPLE 26

0.8 g. of each present compound of (4), (6) and (17), and d-trans-chrysanthemates of the present compounds (1), (2) and (15) were dissolved in 20 ml. of methanol, respectively. The solutions were homogeneously mixed with 99.2 g. of a mosquito coil carrier comprising a mixture of Tabu powder, Pyrethrum marc and wood powder in the ratio of 3 : 5 : 1, and methanol is evaporated. The remainings were added with 150 ml. of water, kneaded thoroughly, and shaped into mosquito coil and dried. Thus, 6 mosquito coils were obtained, respectively.

EXAMPLE 27

0.3 part of the present compound (1), and 0.2 part of tetramethrin were dissolved in a mixture of 7 parts of xylene and 7.5 parts of deodorized kerosene. The solution was filled in an aerosol container. After attaching a valve portion to the container, 85 parts of propellant (e.g. liquified petroleum gas) was charged therein under pressure through said valve. An aerosol was thus obtained.

EXAMPLE 28

0.3 part of the present compounds (4) and (6), respectively, and 0.3 part of fenitrothion were dissolved in a mixture of 7 parts of xylene and 7.4 parts of deodorized kerosene under stirring. Two aerosols were thus obtained from the solutions by the procedures as described in Example 27.

EXAMPLE 29

To a uniform mixture of 25 parts of the present compound (10) and 5 parts of Sorpol SM-200, 70 parts of 300 mesh talc were added and thoroughly mixed by means of a mortar. A wettable powder was thus obtained.

EXAMPLE 30

5 parts of the present compound (13), 5 parts of Toyolignin CT (an excipient, registered trade name sold by Toyobo Co.) and 90 parts of GSM clay (registered trade name for Clay sold by Zieklite Mining Co.) are thoroughly mixed by means of a mortar. Then, the mixture was added with 10 percent by weight of water basing on the weight of the mixture and further mixed well. The thus obtained mixture was granurated by means of a granulator, and air-dried. A granular preparation was thus obtained.

EXAMPLE 31

0.3 part of d-trans-chrysanthemate of the present compound (2), 0.2 part of Tetramethrin, 13.5 parts of deodorized kerosene and 1 part of Atmos 300 (registered trade name for an emulsifier sold by Atras Chemical Co.) were mixed, and added with 50 parts of pure water to make emulsion. The emulsion was filled in an aerosol container together with 35 parts of a mixture of deodorized propane and butane in a ratio of 1 : 3. A water-based aerosol was thus obtained.

EXAMPLE 32

1.5 g. of the present compounds (5), (7) and (8), respectively, were dissolved in 20 ml. of methanol, and the solutions were mixed homogeneously with 98.5 g. of the mosquito coil carrier as described in Example 26, and methanol is evaporated. The residues were added with 150 ml. of water, thoroughly kneaded, shaped into mosquito coil and dried. Three mosquito coils each containing 1.5 percent by weight of the active ingredients are thus obtained, respectively.

The insecticidal effects of the present compositions thus prepared is shown in the following test examples.

TEST EXAMPLE 1

The oil sprays obtained according to Examples 18 to 23 respectively, and a 0.2 percent allethrin oil spray as control, were individually sprayed in an amount of 5 ml., using Campbel's turn table apparatus ["Soap and Sanitary Chemicals", Vol. 14, No. 6, 119 (1938)].

After 20 seconds from the spray, the shutter was opened, and house-fly adults (about 100 flies per group) were exposed to the mist for 10 minutes and were then transferred to an observation cage. In the cage, the flies were fed and were allowed to stand for one day at room temperature. Thereafter, the number of killed flies was countered to calculate the mortality thereof. The results are as shown in Table 2.

TABLE 2

| Composition (oil spray) | | Mortality (%) |
|---|---|---|
| Ex. 18 | [Containing 0.05% of compound (1)] | 90 |
| Ex. 18 | [Containing 0.05% of Compound (2)] | 95 |
| Ex. 18 | [Containing 0.05% of Compound (15)] | 98 |
| Ex. 19 | [Containing 0.1% of Compound (3) and 0.1% of DDVP] | 89 |
| Ex. 20 | [Containing 0.1% of Compound (4)] | 95 |
| Ex. 20 | [Containing 0.1% of Compound (6)] | 98 |
| Ex. 20 | [Containing 0.1% of Compound (9)] | 86 |
| Ex. 20 | [Containing 0.1% of Compound (10)] | 88 |
| Ex. 20 | [Containing 0.1% of Compound (12)] | 90 |

| | | |
|---|---|---|
| Ex. 20 | [Containing 0.1% of Compound (13)] | 92 |
| Ex. 20 | [Containing 0.1% of Compound (17)] | 95 |
| Ex. 21 | [Containing 0.1% of Compound (7) and 0.4% of Piperonylbutoxide] | 85 |
| Ex. 22 | [Containing 0.1% of Compound (11) and 0.4% of Sulfoxide] | 95 |
| Ex. 23 | [Containing 0.1% of Compound (14) and 0.4% of MGK–264] | 82 82 |
| Allethrin 0.2% oil spray | | 80 |

TEXT EXAMPLE 2

The insecticidal effects on housefly adults of the aerosols formulated according to Examples 27, 29 and 31, were tested by the aerosol test method using Peet Grady's chamber [the method disclosed in "Soap and Chemical Specialities, Blue Book", (1965)]. The results are as shown in Table 3.

TABLE 3

| Composition (aerosol) | Sprayed amount (g/1000ft³) | Knock-down ratio (%) 5 min. | 10 min. | 15 min. | Mortality (%) |
|---|---|---|---|---|---|
| Example 27 | 3.30 | 17 | 50 | 81 | 62 |
| Example 28 [Containing compound (4)] | 3.01 | 4 | 38 | 79 | 68 |
| Example 28 [Containing compound (6)] | 3.47 | 8 | 44 | 81 | 64 |
| Example 31 (Water-based aerosol) | 3.24 | 12 | 41 | 78 | 61 |

TEST EXAMPLE 3

About 20 northern house mosquito adults were liberated in a (70 cm)³ glass chamber. Each 1 g. of the mosquito coils formulated according to Examples 26 and 32, respectively, were ignited on both ends and were individually placed at the center in the chamber. The number of knock-down insects was counted after 20 minutes and the knock-down percentages were calculated as more than 80 per cent in each test.

TEST EXAMPLE 4

The emulsifiable concentrate formulated according to Example 24 was diluted with water to 40,000 times. 1.5 liters of the thus prepared test emulsions were charged in a styrol case of 23 cm × 30 cm with a depth of 6 cm. Into the case, about 100 larvae of northern house mosquitoes were liberated, whereby 90 percent or more of the larvae could be killed on the next day.

TEST EXAMPLE 5

10 liters of water was poured into a 14-liter polypropylene bucket. Into the water, the granular preparation formulated according to Example 30 was charged in an amount of 1 g. After one day, 100 full grown northern house mosquito larvae were liberated in the water, whereby more than 90 percent of the larvae could be killed within 24 hours.

TEST EXAMPLE 6

A glass Petri dish of 14 cm in inner diameter and 7 cm in height was coated on the inner wall with butter, leaving at the lower part an uncoated portion of 1 cm in width. Onto the bottom of the dish, the dusts each containing the compounds (1) and (2) formulated according to Example 25 was uniformly dusted individually in a proportion of 2 g./m². Subsequently, 10 German cockroach adults were liberated in the dish and were contacted with the individual dusts for 30 minutes. After 3 days, more than 90 percent of the cockroaches were killed.

TEST EXAMPLE 7

In 1/50,000 Wagner pots were grown rice plants which had elapsed 45 days after sowing. The emulsifiable concentrate containing the compound (1) obtained according to Example 24, and the wettable powder formulated according to Example 29 was diluted individually with water to 500 times. The thus prepared test solutions were individually sprayed out the rice plants in a proportion of 10 ml. per pot, and each pot was covered with wire net. Into the net, 30 adults of green rice leaf hoppers were liberated. After 24 hours, more than 90 percent of the hoppers could be killed.

What we claim is:

1. A cyclopropanecarboxylic acid ester represented by the formula,

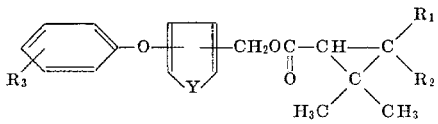

wherein $R_1$ is a hydrogen atom or methyl group, $R_2$ is a methyl, 2-methyl-1-propenyl, 2-methoxycarbonyl-1-propenyl, phenyl or 3,4-methylenedioxyphenyl group when $R_1$ is a hydrogen atom, or a methyl group when $R_1$ is a methyl group, $R_3$ is a hydrogen or halogen atom or a methyl group, and Y is an oxygen or sulfur atom.

2. A compound according to claim 1, wherein Y is oxygen.

3. A compound according to claim 2, wherein $R_1$ is hydrogen and $R_2$ is methyl, 2-methyl-1-propenyl, 2-methoxycarbonyl-1-propenyl, phenyl or 3,4-methylenedioxyphenyl.

4. A compound according to claim 2, wherein $R_1$ is methyl and $R_2$ is methyl.

5. A compound according to claim 1, wherein Y is sulfur.

6. A compound according to claim 5, wherein $R_1$ is hydrogen and $R_2$ is methyl, 2-methyl-1-propenyl, 2-methoxycarbonyl-1-propenyl, phenyl or 3,4-methylenedioxyphenyl.

7. A compound according to claim 5 wherein $R_1$ is methyl group and $R_2$ is methyl group.

* * * * *